Aug. 7, 1945.　　　　　P. E. ATTICK　　　　　2,381,428
HEIGHT-MEASURING DEVICE
Filed Oct. 8, 1943　　　　　2 Sheets-Sheet 2
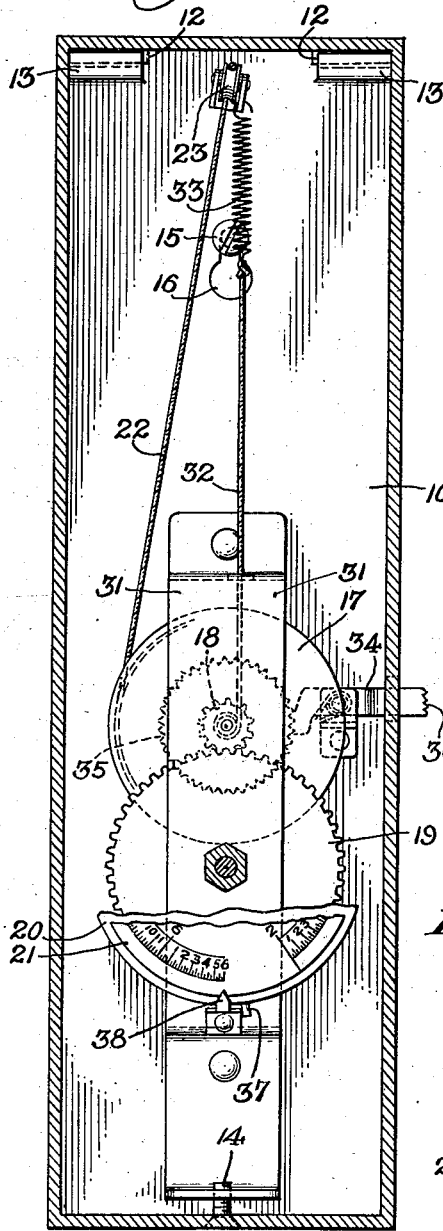
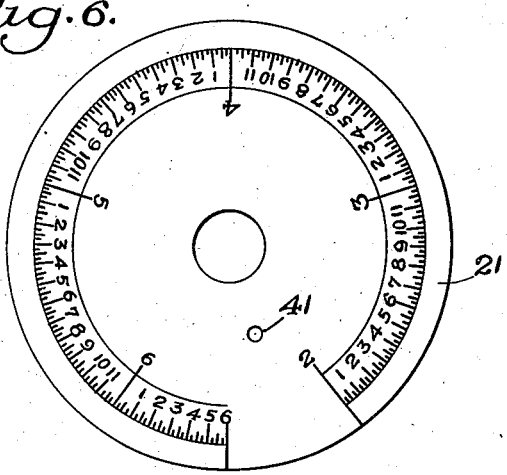
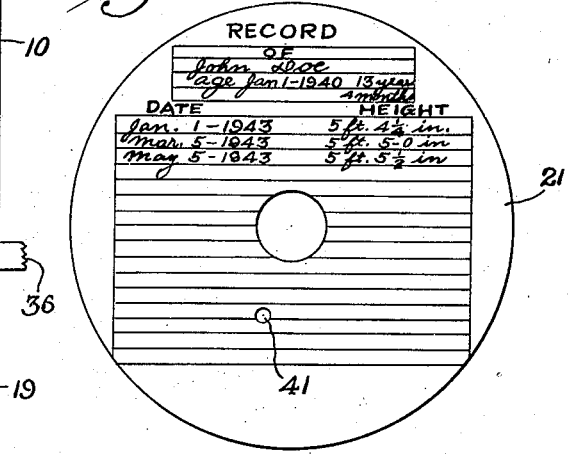
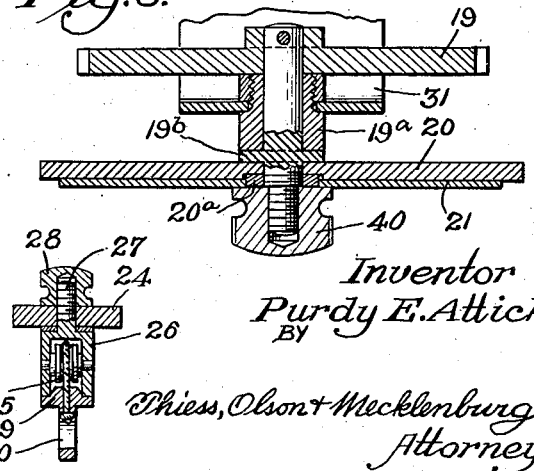
Inventor
Purdy E. Attick
BY
Thiess, Olson + Mecklenburger
Attorneys.

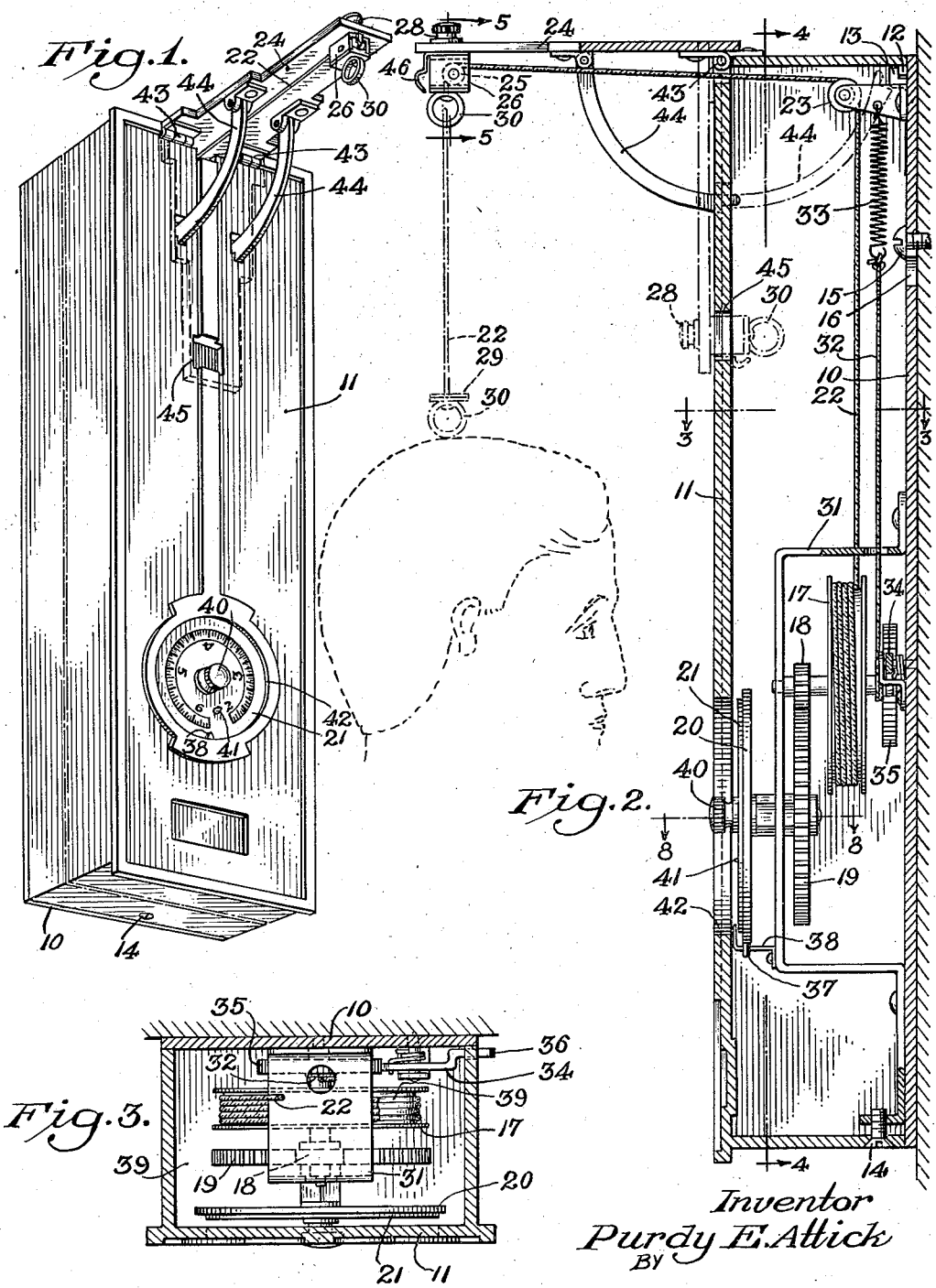

Patented Aug. 7, 1945

2,381,428

UNITED STATES PATENT OFFICE 2,381,428

HEIGHT-MEASURING DEVICE

Purdy E. Attick, Chicago, Ill.

Application October 8, 1943, Serial No. 505,560

8 Claims. (Cl. 33—172)

My invention relates to height-measuring devices, particularly for measuring the heights of persons, and has for an object the provision of means for use in the home for quickly and accurately determining the height of growing children and youths, particularly, to meet the urgent need therefor, and for elders as well, thus eliminating the necessity of resorting to the old haphazard wall and door-jamb defacing method, which is so inaccurate, devastating and troublesome to employ.

A further object is the provision in such a device of means for permitting the ready recordation of such data for each child or youth at frequent periods throughout the growing years and to be able to note the speed of growth at the time, particularly, when this important factor in the health of a child should be constantly observed.

A further object is the provision of means of such convenience, interest, appearance, and pleasure in operating that an incentive is created to keep such important data and they are therefore more certain to be obtained.

A further object is the provision of such a device of attractive design and decoration and of convenient attaching means, so that it may be attached to the wall, door-jamb or other suitable surface and thereby become an added decoration to the room. In the home it can be made an added decoration to the playroom, recreation-room, library, kitchen, etc. Likewise it can be attached to the inside of a closet door, if considered desirable to have it out of sight normally. It may be made light in weight, compact and inexpensive.

A further object of the invention is the provision of a machine of this class in which the measuring scale or chart is preferably in the form of a dial or disc which can be readily attached to the chart or scale carrier of the machine, and as readily detached, and on which a record of the height measured can be marked thereon at the moment the indicator shows it and without removing the chart, so that the data can be transferred later to the back of the chart with other data, if desired, relating to the individual, all for a permanent record of the growth of the child.

Another object is the provision in such a machine of a comparatively thin and narrow cabinet of short length which is light in weight and can be readily suspended on the wall without being obtrusive and without requiring a floor base or platform. The thinness is facilitated by the use of a comparatively thin measuring drum, with the gearing and chart-holding disc in closely associated parallel planes. The narrowness of the cabinet is assisted by the use of reducing gearing between the drum and the chart holder and a helical winding groove for the measuring cable on the drum whereby each convolution of the cable on the drum is the same length, instead of varying in length by piling up on each other, and the number of convolutions permitting a smaller drum of less diameter and consequent narrower cabinet. The shortness of the cabinet is partially due to not using a depending counterweight as a rewind for the drum. The coiled spring attached near the upper end of the cabinet and connected by a rewinding cable to the drum performs that service for the drum without taking other or more room in the length of the cabinet than that required for other purposes. In fact, cabinets of this type have been designed of approximately 2" x 15" x 5".

A further object is the provision of such a device wherein the operating mechanism may all be located on the back board of the cabinet, the front and sides of the cabinet forming a cover unit which may be applied to the back board to cover the same and the mechanism thereon and thus to complete the cabinet, or may be removed to expose the same.

A still further object is the provision of such a device which may be made of metal, plastics, wood, cardboard or other materials which may be adaptable, or such as that known as Bakelite, Formica, or other pressed or molded material.

An additional object is the provision of a device of the class described in which the cabinet has a projecting arm at the top which supports the head plate in position to be drawn down vertically or substantially so onto the top of the head of the person being measured, but which arm, when the measuring is through, may be withdrawn or retracted from its projected position and disposed out of the way in connection with the cabinet. In the preferred form the arm is folded down along the upper front face of the cabinet and becomes a part of the cover design, the unit forming a picture-frame-like object possessing decorative value besides its utilitarian merit. The retractable arm is also of advantage in merchandising and shipping the device, and in storing it in the home in case it is not desired to leave it on the wall or other support between times, or if hung on the inside of a closet door to be used only when the door is swung open. Then the arm can be raised for use and closed down when the door is to be shut.

Other objects and advantages will appear from the detailed description and claims to follow, in connection with the accompanying drawings which illustrate, by way of explanation and not of limitation, an embodiment of the invention, and in which—

Fig. 1 is a perspective view of the device ready for operation;

Fig. 2 is a central vertical-longitudinal section through the device;

Fig. 3 is a cross-sectional plan view on the plane indicated by the line 3—3 in Fig. 2;

Fig. 4 is a vertical-longitudinal section in a plane at right angles to that of Fig. 2, indicated by the line 4—4 of Fig. 2 and looking in the direction of the arrows;

Fig. 5 is a detail sectional view of the headpiece and support at the end of the foldable arm, said view being taken on line 5—5, Fig. 2;

Fig. 6 is a face view of the removable dial chart which is adapted to become the personal height record of a growing child, for instance;

Fig. 7 is a view of the back of said chart showing spaces for the personal data as to the one whose height history is desired, including spaces for the heights and dates of successive measurements;

Fig. 8 is a sectional detail on the line 8—8 of Fig. 2, showing the manner of detachably securing the indicator chart to the chart carrier of the device.

As will be seen, this is not a long, cumbersome device standing on the floor and having a platform on which the person being measured stands, but is a comparatively small and light device which is adapted to be hung on the wall or other place for use where it may remain permanently or merely temporarily. Of course it must be hung a definite distance above the floor, but that will be taken care of in the instruction sheet or notice furnished with the particular device, or by suitable legends applied directly thereto. The device comprises a small cabinet with most of the operative parts secured to the back plate 10, the face 11 and sides and ends of the cabinet forming a removable cover unit. This is secured in place at the top inner edge by lugs 12 on the cover part fitting down into brackets 13 secured to the back plate 10 (Figs. 2 and 4), which arrangement permits the bottom end of cover part to swing outwardly from the back plate, and then, if desired, the cover may be lifted out of the brackets 13 at the top. If a distant removal of the cover is desired, the measuring cable, hereinafter described, may be disconnected. When the cover is in closed positions, screw 14 at the bottom secures the cover in place.

The back plate 10 may be secured to the wall or other support by one or more screws 15 which, if preferred, may be screwed into the wall first and the cabinet hung without removing the cover, by passing the head of the screw through the large lower part 16 of the keyhole-shaped opening in the back 10 and then pulling the cabinet downwardly so that the screw enters the narrow part of the opening. Of course any other desired manner of hanging the cabinet may be employed so long as it is placed a definite height above the floor on which the party stands or sits, as on a chair or stool of known height to be measured.

The main instrumentalities are within this cabinet. They comprise the measuring cable drum 17, pinion 18 connected therewith and meshing with gear 19 which is on the same shaft as chart dial carrier 20, on the face of which the removable indicator dial chart 21 is temporarily secured.

The drum 17 has wound thereon the measuring cable 22 which may be of any desired type, passes up over the pulley 23 carried on a bracket secured to the back member 10 of the cabinet at the top thereof, and thence outwardly through an aperture in the upper front wall of the cabinet and along underneath the horizontally extending arm 24 to the pulley 25 at the outer end of said arm. From here the cable may be pulled down, as shown in dotted lines, to the top of the head of the person being measured.

In order to so pull down the end of this cable conveniently and have the parts keep in their proper position when not so pulled down, I provide an inverted U bracket 26 (Fig. 6) for the pulley 25, having a threaded stem 27 passing up through the outer end of horizontal arm 24, with a nut in the form of a small knob 28 on the outer side securing the same in position. This knob, when the arm is folded down, as will be explained, is grasped to pull the arm out from its closed position to be raised into its horizontal position. A small rectangular plate 29 with a raised central part having bevelled side edges and a depending ring 30 secured on the reverse side, to be grasped by the fingers or a finger inserted, is secured to the end of the cable in any desired way, preferably one which permits ready disconnection to free the cover from the cable in case it is desired to remove the cover to a distance from the back plate. In this way the ring 30 and plate 29 can be grasped by the one being measured, or by someone for him, and pulled down so that the ring touches the top of his head. And when, as hereinafter explained, the cable draws the headpiece back up again, the bevelled edges will steer it into proper position in the bracket 26 and keep it there.

The shaft for the drum 17 and pinion 18 is supported at one end by the back plate 10 of the cabinet and at the other by a bracket 31 which is itself secured to the back plate 10. This bracket also supports, by means of a suitable bearing (Fig. 8), the shaft of gear 19 and chart carrier 20. These gears, the drum, etc., are all in parallel planes and therefore may be brought close together and the depth of the cabinet reduced. In a recent design of the device the thickness of the cabinet is but one and three-fourths inches.

In order to restore the drum, measuring cable and headpiece to normal position after having been used and again freed, a rewind cable 32 is connected at one end to the shaft of drum 17 and its other end is secured to a coiled spring 33 which is suspended from the bracket of roller 23 at the top of the cabinet. When, therefore, the measuring cable 22 is pulled and unwound from drum 17, the rewind cable is wound up on the shaft of the drum against the tension of spring 33. When the parts are freed again the spring will cause the drum to rewind the cable, pulling the headpiece back up to normal position, and return the chart carrier and chart back to zero. Of course, a compression or other suitable spring may be used instead of the tension spring 33, as will be evident.

By this or similar arrangement of the spring and rewind cable the use of a counterbalance weight which would lengthen the cabinet is avoided. Here the rewind requires no additional length of the cabinet over that in use for other purposes.

In order to lock the dial in position when the headpiece has been brought down on the head, so that one may step back to see the indicator and at his leisure mark the weight on the chart, a lock or brake, shown in Figs. 2, 3 and 4, is provided. This comprises a spring-pressed dog 34 having a serrated inner end to engage the small teeth or frictional edge surface on a locking disc 35 on and secured to the drum shaft, the dog being pivoted on a suitable bracket secured to back plate 10 and having a knurled outer end 36 projecting through the notch in the edge of the side of the cover of the cabinet. Pressure upward on this end 36 against the tension of the pivot spring will free the dog from the locking or braking disc and permit the spring and rewind cable to turn the drum and other parts back to normal and restore the headpiece 30 to its uppermost position.

The chart, in order to show clearly on its face the feet, inches and fractions thereof involved, is scaled, preferably from 2 to 6½ feet, as seen in Figs. 1 and 6, which means that the device, when supported at the right height above the floor, is capable of measuring people from 2 to 6½ feet in height. This indicator or dial makes, of course, but one revolution, and a pin 37 (Fig. 2) on the edge of the carrier 20 engages a bracket 38 secured to the main bracket 31, to stop the carrier normally at the zero position. In the particular instance shown, this dial 31 is 3½ inches in diameter, but of course is not limited to that.

Since the diameter of this dial indicator and its carrier substantially determines the width of the cabinet, it is necessary that the drum 17, in order to be kept within the prescribed limits of the cabinet, be rotated several times for once of the dial. This is accomplished by the pinion 18 and gear 19, but the winding of the measuring cable several times around the drum introduces complications. Each revolution, of course, must be the same as the others or inaccuracies may creep in. If the convolutions or some of them wind over another or others, the measurements will be wrong. Accordingly, I have formed the surface of the winding drum 17 into a helical groove 39, the convolutions of which lie side by side and in which each convolution is exactly the same length as the others. Then by attaching the measuring cable to the drum at the beginning of this helical groove, each convolution will be the same length and each will lie in its proper place in the groove and the measurements shown on the scale will be the same throughout. In the present instance I have made the convolutions on the drum exactly one foot in length, in accordance with the divisions on the scale, as seen in Fig. 6, though other proportions and calibrations may be used.

The dial chart 21 is preferably and readily removable from the disc carrier 20. The shaft (Fig. 8) of gear 19, pinned or otherwise secured thereto, projects forwardly through bearing sleeve 19a which is secured to bracket 31. A flange or collar 19b on this shaft is just in front of the bearing and at the rear of the carrier disc 20 and chart disc 21. A threaded circular nut 20a, preferably knurled on the edge or provided with small holes for a special spanner wrench, secures the carrier 20 to the said shaft against the flange. A knob nut 40 serves to clamp the chart disc 21 in place on the carrier 20 and permits its ready removal and application. The hole in the chart 21 is round to fit over nut 20a and a pin on the carrier 20 fits into hole 41 in the chart 21 at one side to insure the correct placing of the chart on the carrier.

As aforesaid, it is important from the health standpoint, as well as the natural interest one may have in it, regularly to measure the heights of growing children and keep a record of the same. The removable chart 21 of this invention enables this to be done. Each child or person may have his own chart, special spaces for the name and other data being preferably on the back thereof, as shown in Fig. 7, and also a series of spaces or lines for the entry of the height measurements and the respective dates of measurement.

On the face of the chart the scale is divided in feet, inches and fractions of inches. On this dial, persons or objects can be measured from 2 feet to 6½ feet in height. As the dial rotates counterclockwise in the pulling down of the head-engaging piece or ring 30, the correct height will be indicated on the scale opposite the pointer 42 when the dial chart 21 comes to rest. The brake 34 holds the chart stationary even though the head-engaging ring 30 is released. At this time the point on the chart 21 opposite the pointer or indicator 42 can be marked by a pencil dot or dash in the clear spaces on the chart adjacent the scale, preferably outside the scale.

After so marking the front of the chart 21 it can be removed and the proper entries made on the back thereof in the spaces provided for same. The reading in feet and inches for recording on the back will be taken from the scale on the front at the point where the mark has been made.

The chart may then be kept by or for the child or person whose height has been so measured and recorded.

The blank space, particularly that inside the scale on the front of the chart, may be used to note the date when the corresponding dot or dash on the other side of the scale was made. In fact, any desired data can be written in these frontal spaces.

After measuring and marking same on the front of the chart, the brake release 36 may be raised and the parts are returned to normal position. The chart 21 may be removed before or after releasing the brake.

The horizontal arm 24 projecting from the top of the cabinet is preferably made retractile so that it may be withdrawn from its projecting position when the device is not in use. This is of value in shipping and handling the device and enables it to be used in the home in places where it might be unsightly if permanently projecting or interfere with the closing of doors, or storing the device away between times. This may be done in various ways, but in the particular device shown and as I at present prefer to make it, the arm is foldable down along the front of the cabinet, as indicated in dotted lines in Fig. 2, where it is not only out of the way but, in this instance, conforms to the ornamentation of the cabinet, forms a part thereof and adds to the attractive appearance of the whole.

As shown, the arm preferably is wider at its inner end where it is hinged, as at 43, to the top edge of the cabinet cover. It is narrowed toward the front by steps and, as previously explained, carries the pulley bracket 26 at the free end.

In order to support the arm, horizontally curved braces 44, preferably two of them, hinged at their upper ends to the under side of the arm, extend through apertures in the cabinet cover and catch over the edges thereof, as shown in Figs. 1 and 2.

When the arm 24 is to be let down and folded up, the braces 44 are raised at their inner ends to free the cabinet. The arm then swings down into the dotted-line position of Fig. 2, the braces 44 taking the curved positions indicated within the cabinet, the headpiece 30 and pulley bracket 26 entering the hole 45 in the cover of the cabinet, and the arm itself lying closely along the front face of the cabinet.

In this position the nut or knob 28 on the outside of the end of the arm 24, which serves the function of securing the pulley bracket in place, acts now as a convenient knob to enable the arm to be pulled out away from the cabinet and swung up to its horizontal position.

In this connection a spring 46 at the end of the pulley bracket 26 on the end of arm 24 engages the edge of hole 45 in the cabinet cover when the bracket is pushed therein to hold the arm frictionally in closed position.

In case it becomes necessary, for any reason, to retie the knot or a knot in the end of cable 22 in the loop 30 forming the head-engaging piece, or the cable breaks, so that when the headpiece is pulled up to normal position and the cable is wound on the drum the carrier 20 and chart 21 will not go back to the zero position, the chart 21 is removed, if not already off, the nut 20a is loosened and the carrier 20 is rotated back to the zero position, which is when the pin 37 strikes the bracket 38. The nut 20a is then again tightened to secure the carrier 20 in its new place, and the parts are ready for accurate measuring. It is assumed, of course, that there will be some excess cable 22 on the drum 17, so that the capacity of the machine will remain the same as before.

It is obvious that various changes and alterations may be made in the embodiment of this invention without departing from the spirit or scope of the invention as intended to be set forth in the foregoing and covered by the appended claims.

I claim:

1. A device for measuring and recording heights comprising a height-measuring instrument having a measuring and recording chart carrier, a readily detachable measuring and recording chart on and movable with the carrier and having a height scale on the face thereof, a pointer on the instrument co-operating with the said scale, a head-engaging piece above capable of being pulled down on the head of the person being measured, said headpiece being operatively connected with said instrument to cause it to measure and visually indicate by said pointer and scale on said chart the height of the person, means for automatically locking said pointer and scale in said indicating position, and means enabling the manual marking on said chart of the position of the pointer on the scale before the parts are unlocked and return to normal, and thereby recording the height so measured.

2. A device of the class described comprising a height-measuring instrument including a dial carrier at the front of the device, a frontally exposed measuring dial on the carrier, means readily to attach said dial in proper operating and measuring relation to said carrier and to detach the same, said dial having a height scale adjacent the periphery thereof, a pointer on the device co-operating with dial and scale, a head-engaging piece above capable of being pulled down on the head of the person being measured, said head-piece being operatively connected with said instrument to cause it to measure and visually indicate by said pointer and scale on said chart the height of the person being measured, and means for temporarily locking said pointer and scale in indicating position.

3. A height-measuring and indicating device comprising a scale and pointer, a head-piece suspended from above and capable of being pulled down on the head of the person being measured, said head-piece causing the height of said person to be indicated by said scale and pointer, means for automatically locking said scale and pointer in said indicating position, and means for unlocking said locking means.

4. A machine of the class described comprising a cabinet, a drum therein, a measuring cable wound on the drum, an overhead head-engaging piece suspended from the other end of the cable and adapted to be pulled down on the head of the person being measured, a rewind cable connected with the drum and extending upwardly in the cabinet, means in the upper part of the cabinet connected with the other end of the rewind cable and tensionally opposing the unwinding of the measuring cable, and height-indicating means operated in connection with said drum to show the height of the person being measured when the headpiece is drawn down to the top of his head.

5. A height-measuring instrument including a comparatively short, thin and narrow wall cabinet having an overhead forwardly projecting arm at the top, a head-engaging piece suspended from said arm over a person standing before the cabinet to be measured, a cable connected with said headpiece and extending back into the cabinet, a measuring instrument in the cabinet including an indicator dial in the face of the cabinet, reducing gearing and a thin flat winding drum in back of the dial and in planes parallel thereto, said cable being wound on the drum and serving when the headpiece is drawn down to the person's head to rotate the drum and indicator to show the height of the person being so measured, a rewind cable extending upwardly in the cabinet and connected at one end to the cabinet and at the other to the drum, and a tension spring between the cable and cabinet to rewind the cable on the drum and reset the indicator and headpiece when the parts are released.

6. A height-measuring device comprising a measuring instrument, a laterally projecting arm, a headpiece suspended therefrom arranged to be drawn down on the top of the head of the person being measured and thereby to operate said measuring device to indicate the height, and means readily to change said arm from its projecting position to a vertical non-projecting position.

7. A height-measuring device comprising a vertical cabinet, measuring instruments therein, an arm projecting laterally at the top of the cabinet, a headpiece suspended from the outer end of said arm to be brought down on top of the head to measure the height, and means for folding said arm down along the cabinet when the device is not in use.

8. A height-measuring device comprising a wall cabinet, a height-indicating device therein, an arm hinged to said cabinet and projecting horizontally therefrom when the device is in use, a bracket at the end of the arm, a head-piece suspending from the free end of the arm and bracket and arranged to be drawn down on top of the head of the person being measured and simultaneously to operate the height indicating device in the cabinet, and means to enable folding said arm down along the cabinet with the head-piece and bracket projecting into the same and out of sight.

PURDY E. ATTICK.